United States Patent
Guevel et al.

(12)

(10) Patent No.: US 7,387,828 B2
(45) Date of Patent: Jun. 17, 2008

(54) UNIDIRECTIONAL SHEET MADE OF A COMPOSITE

(75) Inventors: Jean Guevel, Viriat (FR); Guy Bontemps, Tenay (FR)

(73) Assignee: SA Schappe, Ban de Laveline (FR)

( * ) Notice: Subject to any disclaimer, the term of this patent is extended or adjusted under 35 U.S.C. 154(b) by 43 days.

(21) Appl. No.: 10/296,924

(22) PCT Filed: Jul. 9, 2001

(86) PCT No.: PCT/FR01/02208

§ 371 (c)(1),
(2), (4) Date: Mar. 14, 2003

(87) PCT Pub. No.: WO02/06036

PCT Pub. Date: Jan. 24, 2002

(65) Prior Publication Data

US 2004/0109991 A1 Jun. 10, 2004

(30) Foreign Application Priority Data

Jul. 13, 2000 (FR) .................................. 00 09257

(51) Int. Cl.
- B32B 17/12 (2006.01)
- B32B 25/02 (2006.01)
- B32B 9/08 (2006.01)
- B32B 3/00 (2006.01)
- D06N 7/04 (2006.01)

(52) U.S. Cl. .................. 428/293.4; 428/239.7; 428/295.4; 428/408; 428/172; 428/155; 428/175; 428/210

(58) Field of Classification Search ................ 428/370, 428/371, 376, 408, 172, 155, 175, 210, 293.4, 428/293.7, 295.4; 442/354, 366–367
See application file for complete search history.

(56) References Cited

U.S. PATENT DOCUMENTS

| 5,910,361 A | * | 6/1999 | Guevel et al. ............... 428/364 |
| 6,045,906 A | | 4/2000 | McMahon et al. |
| 6,051,313 A | * | 4/2000 | Olry et al. ................... 428/371 |

FOREIGN PATENT DOCUMENTS

| EP | 0 062 142 A1 | 10/1982 |
| EP | 0 156 599 A1 | 10/1985 |
| EP | 354139 A * | 7/1988 |
| EP | 0 466 618 A1 | 1/1992 |
| EP | 0 488 389 A2 | 6/1992 |
| EP | 0 599 695 A1 | 6/1994 |
| EP | 0 602 618 A1 | 6/1994 |
| EP | 1 054 091 A1 | 11/2000 |
| FR | 2634790 * | 7/1988 |
| FR | 2 634 790 A1 | 2/1990 |
| JP | 07024830 A * | 7/1993 |
| WO | WO 96/01177 | 1/1996 |
| WO | WO 98/44183 | 10/1998 |

* cited by examiner

*Primary Examiner*—Lynda Salvatore
(74) *Attorney, Agent, or Firm*—Oliff & Berridge PLC

(57) ABSTRACT

The invention concerns a web comprising an intimate mixture of mixed slivers of long reinforcing staple fibres (14) obtained by stretch-breaking and long thermoplastic matrix fibres (15), those different fibres being parallel in the mixture.

8 Claims, 2 Drawing Sheets

UNIDIRECTIONAL SHEET MADE OF A COMPOSITE

The subject of the present invention is a unidirectional sheet made of a composite.

Such a sheet is intended for producing industrial parts of complex shape, in particular having drawn areas, and able to be used in various fields, such as the aeronautics field or the automobile field.

Composites are expensive to manufacture and are generally reserved for very high-performance applications. The composite products are often in the form of wovens, braids or knits. To limit the cost, it has already been envisioned to use unidirectional sheets of filaments.

In a manner known per se, the filaments are juxtaposed and held parallel to one another, limiting their superposition.

They then undergo a thermoplastic powder coating operation followed by calendering by passing them through smooth rolls in order to obtain a stiffened sheet. Alternatively, it is possible to make the parallel filaments pass through a bath of molten polymer before expressing the excess polymer.

The drawback of such a sheet, apart from its high manufacturing cost, is to provide a continuous array of filaments in the longitudinal direction which is ill-suited to the deformations involved in the production of parts of complex shape, and especially of deep-drawn parts.

It is also known, from document EP 0 466 618, to produce hybrid yarns obtained by mixing discontinuous carbon fibers with thermoplastic matrix fibers for the purpose of obtaining various preforms from wovens, braids, knits or unidirectional sheets.

Such unidirectional sheets are therefore produced from yarns of circular cross section, which have to be warped and then tied together transversely using a polymer yarn. This polymer yarn must be of the same kind as that constituting the meltable fraction containing the yarn. The spacing of the yarns constituting the warp must be sufficient to allow spreading of the fibers after the matrix has melted, while preventing interstitial voids. This sheet, because of the fact that the array of yarns must be open, is fragile and not easy to handle. It is ill-suited to the cutting of preforms for the subsequent production of consolidated parts. Furthermore, the manufacture of the yarn, then of the unidirectional sheet, are expensive and render and the product ill-suited to the economic constraints in various branches of industry.

The object of the invention is to provide a unidirectional sheet made of a composite, which comprises at least one type of reinforcing fiber, is obtained economically and is intended for the manufacture of complex parts possibly with regions that are deep drawn, while allowing a very short processing and production time.

For this purpose, the unidirectional sheet to which the invention relates comprises an intimate mixture of mixed tapes consisting of long discontinuous reinforcing fibers obtained by cracking and of long thermoplastic matrix fibers, these various fibers being parallel in the mixture.

The technology of cracking continuous fibers offers the possibility of obtaining tapes consisting of discontinuous fibers of variable lengths, for high-modulus and high-strength fibers, such as carbon fibers, glass fibers or para-aramid fibers. Likewise, the thermoplastic polymeric fibers may undergo the same conversion or may be obtained by mechanical chopping through variable lengths and be converted by the conventional means of carding, combing and drawing.

According to one feature of this sheet, the average length of the reinforcing fibers is around 80 mm with a divergence in the lengths of less than or equal to 35% with respect to this average length.

As regards the lengths of the thermoplastic fibers, these lie within a range varying between 40 and 180 mm.

According to another feature of the invention, the number of traces T of reinforcing fibers in the final mixture is greater than 300. This makes it possible to obtain excellent intimacy in the mixing of the fibers to obtain a preconsolidated sheet in the shortest possible time interval.

According to one feature of this sheet, the constituent reinforcing fibers of a sheet are chosen from at least one of the families of following materials:

- carbon, coming from PAN, pitch or rayon precursors with the criterion: 190 GPa<E<700 Gpa(E being the tensile modulus);
- glass of the E, R, S or D type;
- para-aramid with the criterion: 60 Gpa<E<140 Gpa(E being the tensile modulus);
- polybenzimidazole (PBO) of the AS-H-M type with the criterion: E>190 Gpa (E being the tensile modulus).

According to one option, the constituent matrix fibers of a sheet are chosen from at least one of the families of the following heat-stable materials: polyphenylenesulfide (PPS), polyetherimide (PEI), polyethersulfone (PES), polyetheretherketone (PEEK) and polyetherketone (PEK).

According to another option, the constituent matrix fibers of a sheet are chosen from at least one of the families of the following standard thermoplastics: polyether terephthalate (PET), polyamide (PA), polypropylene (PP), polycarbonate (PC), polybutadiene terephthalate (PBT) and polyethylene (PE).

To optimize the cohesion of the sheet, it comprises a tape or yarn of composition identical to the mixed tapes forming the longitudinal direction, placed in a direction approximately perpendicular to the reinforcing fibers and, for example, being deposited in a zigzag on the sheet.

A process for manufacturing this sheet consists:

- in producing tapes of reinforcing fibers that have undergone a cracking operation and tapes of thermoplastic matrix fibers that have undergone a cracking or chopping operation;
- in producing the intimate mixture of tapes of these two components with $n_1$ reinforcing fiber tapes and $n'_1$ matrix fiber tapes, by pulling on the various parallel tapes and making them pass through a system of needles in order to parallelize the fibers while at the same time mixing them;
- in successively carrying out this same operation using the multicomponent tapes resulting each time from the previous operation;
- in continuously taking an assembly of parallel tapes, which consists of an intimate mixture of reinforcing fibers and matrix fibers obtained during the preceding operations, into a chamber of heated to a temperature more than several tens of ° C. above the melting point of the constituent material of the thermoplastic matrix; and
- passing the sheet between cooled rolls, which lower the temperature of the sheet to below the solidification temperature of the polymer and which exert pressure on the sheet in order to form a preform consisting of mutually parallel reinforcing fibers embedded in a solid thermoplastic polymer matrix.

Advantageously, before the sheet is introduced into the heated chamber, this process consists in continuously depositing on the sheet a tape or yarn of composition identical to the mixed tapes forming the longitudinal direction that form, for example, zig-zags in a direction perpendicular to the direction of the reinforcing fibers.

In any event, the invention will be clearly understood with the aid of the description that follows, with reference to the appended schematic drawing showing, by way of nonlimiting example, one embodiment of an apparatus for obtaining this sheet, together with illustrations of the fibrous mass:

Figure 1:
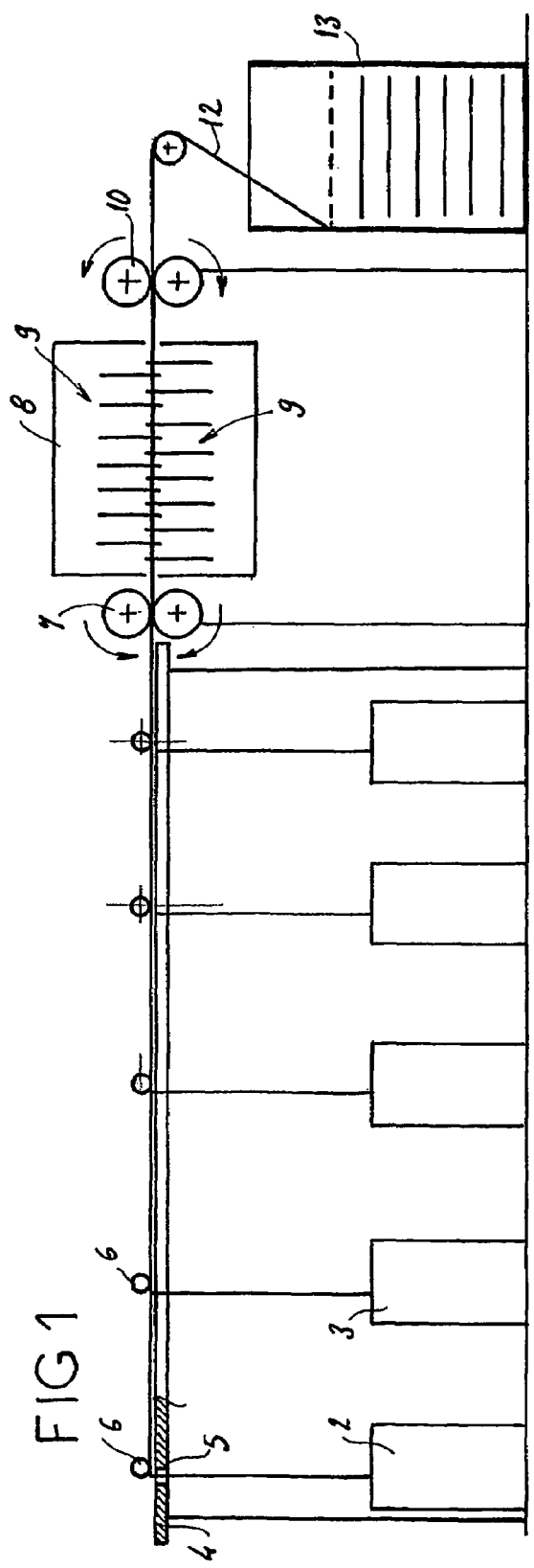
FIG. 1 is a side view of a mixing machine.

In practice, reinforcing fiber tapes and matrix fiber tapes are obtained, in the case of the reinforcing fibers, by a fiber cracking and mixing operation and, in the case of the matrix fibers, by a cracking operation or a chopping operation.

The various reinforcing fiber tapes and thermoplastic matrix fiber tapes are deposited in pots 2, 3 respectively, placed beneath a table 4. The tapes leaving the pots pass through openings 5 made in the table, the openings 5 for the various pots being transversely offset with respect to one another, and some of the pots being longitudinally offset relative to one another. Each tape, after having passed through the table 4, passes over a motor-driven roller 6 and is carried along longitudinally to the table, all the tapes being parallel to one another. The various tapes pass between two drive rolls 7 before entering a drawing head 8. This drawing head 8 comprises two opposed combs 9 undergoing a square displacement movement, that is to say a forward movement, in which the tines of the combs are engaged in the tapes and are displaced in the same direction as the latter, followed by a comb retraction and return movement into a rear position some distance from the tapes, before again penetrating the latter. Placed downstream of the drawing head 8 are forwarding rolls 10 which rotate more quickly than the drive rolls 7 and impart a greater movement than the translational movement of the combs 9. The combination of the components impose parallelism on the fibers relative to one another, and mixing of the reinforcing fibers with the matrix fibers. A mixed tape 12 is collected in a collecting pot 13. It is followed in succession by several mixing operations of this type, taking, for each mixing operation, following the first one, a series of mixed tapes obtained from the immediately preceding mixing operation.

Thus:

if the first machine mixes $n_1$ reinforcing fiber tapes with $n'_1$ matrix fiber tapes, the second machine mixes $n_2$ bi-component tapes coming from machine No. 1, the third machine mixes $n_3$ bi-component tapes coming from machine No. 2, and so on, until the m-th machine, which mixes nm bi-component tapes coming from machine No. m-1.

The mixing is considered as valid if the product:

$$n \times n_2 \times n_3 \ldots nm > 300 = T$$

(T: number of traces) with the condition:

$$n = n_1 \text{ if } n_1 < n'$$

$$n = n'_1 \text{ if } n'_1 < n_1.$$

The intimacy of mixing is an essential condition for obtaining a preconsolidated sheet in the shortest possible time interval.

Figure 5:
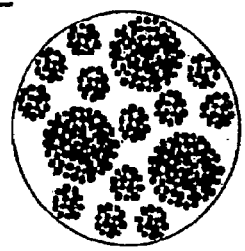
FIGS. 4 and 5 are two views of the mixing of the constituent fibers of the sheet during manufacture of this sheet and pre-preconsolidation, respectively.
Figure 4:
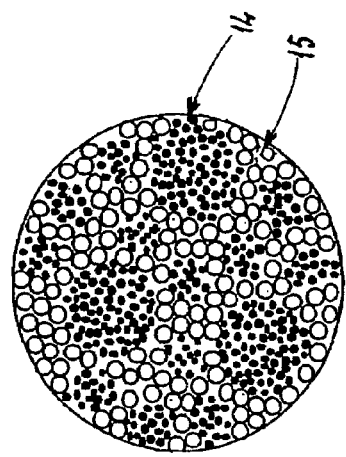

FIGS. 4 and 5 show two schematic cross-sectional views of the fibrous mass, respectively after mixing, that is to say after the operation that has just been described, and after the liberation of the thermoplastic matrix fibers. In these figures, and especially FIG. 4, the reinforcing fibers are denoted by the reference 14 and the matrix fibers by the reference 15. In FIG. 5, the matrix fibers are no longer portrayed, since they have melted.

Proper distribution of the reinforcing fibers and matrix fibers makes it possible to obtain a preconsolidated sheet in a very short time.

To be precise, the impregnation time is given by Darcy's law $$t_1 = \frac{\eta x^2 (1 - vf)}{k(Pe - Px)}$$

$t_1$: impregnation time (seconds)

η: dynamic viscosity of the polymer melt (Pa·s)

x: mean distance between matrix fibers (m)

vf: decimal volume fraction of matrix k: permeability of the fibrous binary mixture (m²)

Pe: external pressure applied to the preform (Pa)

Pc: capillary pressure (Pa).

We have been able to demonstrate the very strong dependence of the impregnation time $t_i$ compared with the mean distance x of the matrix fibers.

This distance x varies inversely with the number of traces T, reaching, however, an incompressible minimum value.

Figure 2:
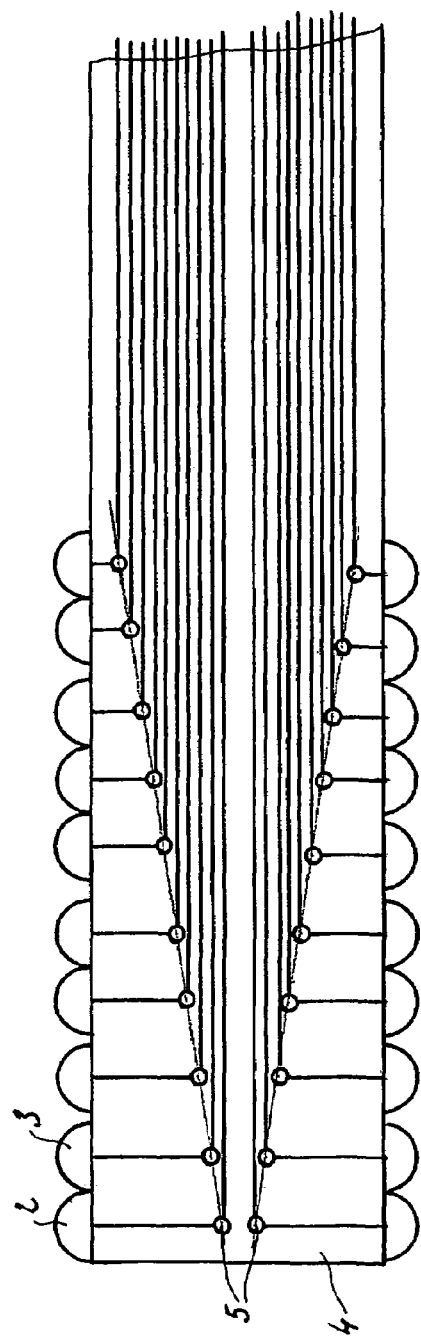
FIG. 2 is a partial top view.
Figure 3:
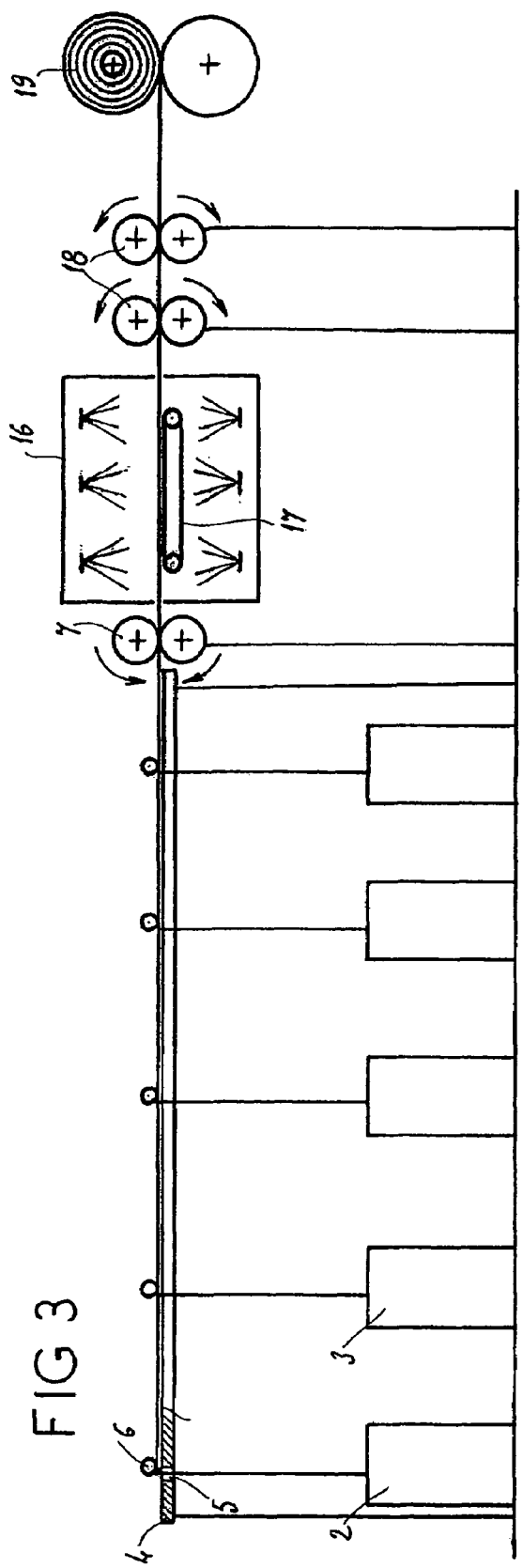
FIG. 3 is a side view of a sheet preconsolidation machine.

FIG. 3 shows a machine for continuously preconsolidating a unidirectional sheet. This machine has the same overall structure as the machine shown in FIGS. 1 and 2, so that the same elements are denoted by the same references as previously. In this machine, all the pots 2, 3 contain mixed tapes obtained from the previous mixing operation. After having passed between two stainless steel drive rolls, the sheet penetrates a chamber 16 heated to a temperature above the melting point of the polymer, this temperature increment possibly being around 60° C. The sheeting may be produced by infrared, of moderate wavelengths, in order to ensure maximum energy absorption in the fibrous mass. The heated chamber 16 is sealed and reflective. A perforated stainless steel conveyor 17 supports the fibrous sheet during the polymer heating/melting operation. The speed of advance of the sheet is identical to the speed of advance of the sheet on the feed table.

Placed downstream of the chamber 16 are two series of calandering rolls 18 which compress the sheet, lowering the temperature to below the solidification point of the polymer. These metal rolls 18 are coated with polytetrafluoroethylene for those at the bottom and fitted with a silicone rubber or fluorinated rubber for those at the top. The various rolls are cooled, for example by a water circulation system that can be modulated in terms of flow rate. The pressure exerted by the rolls on the preform must be greater than 10 bar (1 bar=101 300 Pa).

The preconsolidated sheet is then wound up on a receiving device 19 when the sheet thicknesses are less than or equal to 0.5 mm, or is cut into panels with a length, for example, of 2 m in the case of thicknesses greater than 0.5 mm.

The sheets thus obtained consist of mutually parallel reinforcing fibers embedded in a solid thermoplastic polymer matrix.

It is then possible at a manufacturer's premises to immediately cut blanks for the purpose of carrying out thermoforming operations. The orientation of the fibers may be chosen according to the direction of the stresses, by superposing several cut blanks. A finished product may be obtained as follows:

cutting of the blanks of unidirectional sheets;
heating by infrared;
deposition in a cold mold;
stamping;
removal.

The discontinuity of the reinforcing fibers induces a degree of freedom which makes it possible to obtain deep-drawn parts without breaking the array of fibers, with a short production cycle time of between 1 and 3 minutes for example.

An illustrative example of a composite unidirectional sheet according to the invention is given below:

composition:
  69% of craced carbon fibers with a mean length of 80 mm and a strength of between 190 and 700 GPa,
  31% of chopped nylon-12 polyamide fibers of 80 mm average length;
First mixing machine:
  23 carbon tapes,
  6 polyamide tapes;
Second mixing machine:
  12 carbon+polyamide mixed tapes;
Third mixing and consolidation machine:
  30 carbon+polyamide mixed tapes;
Optimum mixing conditions:

$$n = n_1 = 6 \; n_1 < n_2 \; \text{with} \; n_2 = 23$$

$$T = 6 \times 12 \times 30 = 2\,160 > 300;$$

mass per unit area of the unidirectional sheet before and after preconsolidation:
  width: 0.6 m
  mass per unit length of the tapes: 14 g/m
  mass per unit area:

$$\frac{14 \times 30}{0.6} = 700 \; \text{g/m}^2;$$

Thickness after consolidation:
  density of the composite:

$$0.44 \times 1.01 + 0.56 \times 1.78 = 1.45 \; \text{g/cm}^3$$

[lacuna]

$$\frac{700}{1.45 \times 10^4} = 0.045 \; \text{cm};$$

Heating temperature:
  melting point of the polyamide: 78° C.
  oven temperature: 178+60=238° C.

As is apparent from the foregoing, the invention greatly improves the existing technique by providing a composite unidirectional sheet, which is simple in structure and inexpensive and rapid to process, allowing it to be used in many industrial applications.

As goes without saying, the invention is not restricted to only the one embodiment of this sheet, described above by way of example, but on the contrary it encompasses all variants thereof. Thus, in particular, the reinforcing fibers could be of several different types without thereby departing from the scope of the invention.

The invention claimed is:

1. A unidirectional sheet made of a composite, wherein the unidirectional sheet comprises an intimate mixture of mixed tapes, wherein the mixed tapes comprise long discontinuous and mutually parallel reinforcing fibers obtained by cracking and long thermoplastic matrix fibers, and wherein the reinforcing fibers and thermoplastic matrix fibers are heated such that the reinforcing fibers are embedded in a solid thermoplastic polymer matrix formed of melted thermoplastic matrix fibers.

2. The unidirectional sheet as claimed in claim 1, wherein the average length of the reinforcing fibers is about 80 mm with a variation in the lengths of individual ones of the reinforcing fibers being less than or equal to 35% with respect to this average length.

3. The unidirectional sheet as claimed in claim 1, wherein the number of traces of reinforcing fibers in the final mixture is greater than 300.

4. The unidirectional sheet as claimed in claim 1, wherein the constituent reinforcing fibers of a sheet are chosen from at least one of the families of following materials:
  carbon, coming from PAN, pitch or rayon precursors with the criterion: 190 GPa<E<700 Gpa (E being the tensile modulus);
  glass of the E, R, S or D type;
  para-aramid with the criterion: 60 Gpa<E<140 Gpa (E being the tensile modulus);
  polybenzimidazole (PBO) of the AS-H-M type with the criterion: E>190 Gpa (E being the tensile modulus).

5. The unidirectional sheet as claimed in claim 1, wherein the constituent polymer matrix of a sheet is chosen from at least one of the families of the following heat-stable materials: polyphenylenesulfide (PPS), polyetherimide (PEI), polyethersulfone (PES), polyetheretherketone (PEEK) and polyetherketone (PEK).

6. The unidirectional sheet as claimed in claim 1, wherein the constituent polymer matrix of a sheet is chosen from at least one of the families of the following standard thermoplastics: polyether terephthalate (PET), polyamide (PA), polypropylene (PP), polycarbonate (PC), polybutadiene terephthalate (PBT) and polyethylene (PE).

7. A process for manufacturing a unidirectional sheet made of a composite as claimed in claim 1, comprising:
  producing tapes of reinforcing fibers that have undergone a cracking operation and tapes of thermoplastic matrix fibers that have undergone a cracking or chopping operation;
  producing the intimate mixture of tapes of these two components with $n_1$ reinforcing fiber tapes and $n'_1$ matrix fiber tapes, by pulling on the various parallel tapes and making them pass through a system of needles in order to parallelize the fibers while at the same time mixing them;
  successively carrying out this same operation of producing the intimate mixture of tapes using the multicomponent tapes resulting each time from the previous operation of producing tapes;
  continuously taking an assembly of parallel tapes, which comprises an intimate mixture of reinforcing fibers and matrix fibers obtained during the preceding operations, into a chamber of heated to a temperature more than several tens of ° C. above the melting point of the constituent material of the thermoplastic matrix; and passing the sheet between cooled rolls, which lower the temperature of the sheet to below the solidification temperature of the polymer and which exert pressure on the sheet in order to form a preform consisting of mutually parallel reinforcing fibers embedded in a solid thermoplastic polymer matrix.

8. The process as claimed in claim 7, wherein before the sheet is introduced into the heated chamber, the process further comprises continuously depositing on the sheet a tape or yarn of composition identical to the mixed tapes forming the longitudinal direction that form zig-zags in a direction perpendicular to the direction of the reinforcing fibers.

* * * * *